(12) United States Patent
Lux et al.

(10) Patent No.: US 11,511,550 B2
(45) Date of Patent: Nov. 29, 2022

(54) SYSTEMS AND METHODS FOR DECORATING SUBSTRATES

(71) Applicant: ACTEGA North America Technologies, Inc., Delran, NJ (US)

(72) Inventors: Benjamin David Lux, Providence, RI (US); Andrew W. Marsella, Providence, RI (US)

(73) Assignee: ACTEGA North America Technologies, Inc., Cinnaminson, NJ (US)

(*) Notice: Subject to any disclaimer, the term of this patent is extended or adjusted under 35 U.S.C. 154(b) by 651 days.

(21) Appl. No.: 16/458,842

(22) Filed: Jul. 1, 2019

(65) Prior Publication Data
US 2020/0001620 A1 Jan. 2, 2020

Related U.S. Application Data
(60) Provisional application No. 62/692,941, filed on Jul. 2, 2018.

(51) Int. Cl.
| | | |
|---|---|---|
| *B41J 3/407* | (2006.01) | |
| *B41J 2/48* | (2006.01) | |
| *B65C 9/00* | (2006.01) | |
| *B41M 7/00* | (2006.01) | |
| *B41J 11/00* | (2006.01) | |

(52) U.S. Cl.
CPC ............... *B41J 3/4073* (2013.01); *B41J 2/48* (2013.01); *B41J 3/4075* (2013.01); *B41J 11/0022* (2021.01); *B41J 11/00214* (2021.01); *B41M 7/00* (2013.01); *B65C 9/0015* (2013.01);
(Continued)

(58) Field of Classification Search
CPC .................. B41J 3/4073; B41J 11/0022; B41J 11/00214; B41J 2/48; B41J 3/4075; B41M 7/00; B65C 9/0015; B32B 2307/75; B32B 2451/00
See application file for complete search history.

(56) References Cited

U.S. PATENT DOCUMENTS

| | | |
|---|---|---|
| 5,431,763 A | 7/1995 | Bradshaw |
| 5,735,996 A | 4/1998 | Ashgar et al. |

(Continued)

FOREIGN PATENT DOCUMENTS

| | | |
|---|---|---|
| CL | 199701382 | 7/1997 |
| CN | 100999260 A | 7/2007 |

(Continued)

OTHER PUBLICATIONS

International Preliminary Report on Patentability for International Application No. PCT/US2019/040133 dated Jan. 14, 2021.

(Continued)

*Primary Examiner* — Vishal I Patel
(74) *Attorney, Agent, or Firm* — Wolf, Greenfield & Sacks, P.C.

(57) ABSTRACT

Systems and methods for forming and applying decorations onto substrates are disclosed. According to some aspects, a decoration may be formed on a carrier web at a decoration forming station positioned along a web path. The decorations may be transported along the web path to an application station at which the decorations are applied to substrates from the carrier web.

13 Claims, 6 Drawing Sheets

(52) U.S. Cl.
CPC ....... *B32B 2307/75* (2013.01); *B32B 2451/00* (2013.01); *B65C 2009/0028* (2013.01)

(56) References Cited

U.S. PATENT DOCUMENTS

| | | | |
|---|---|---|---|
| 6,051,311 | A | 4/2000 | Osaka |
| 6,379,766 | B1 | 4/2002 | Blom et al. |
| 10,889,401 | B2 | 1/2021 | Lux |
| 11,325,737 | B2 | 5/2022 | Lux et al. |
| 2005/0136229 | A1 | 6/2005 | Baldwin et al. |
| 2008/0047660 | A1 | 2/2008 | Angel et al. |
| 2010/0243139 | A1 | 9/2010 | Von Hagel et al. |
| 2010/0326581 | A1 | 12/2010 | Roseman |
| 2015/0266606 | A1 | 9/2015 | Wiegers et al. |
| 2017/0182705 | A1 * | 6/2017 | Allen ........................ B65C 9/28 |
| 2018/0346174 | A1 | 12/2018 | Lux et al. |

FOREIGN PATENT DOCUMENTS

| | | | |
|---|---|---|---|
| CN | 101616803 A | 12/2009 | |
| CN | 102026878 A | 4/2011 | |
| CN | 104736440 A | 6/2015 | |
| CN | 105189120 A | 12/2015 | |
| CN | 105966713 A | 9/2016 | |
| DE | 36 38 511 A1 | 5/1988 | |
| DE | 196 21 857 A1 | 12/1997 | |
| DE | 200 06 315 U1 | 9/2000 | |
| DE | 10 2015 203196 A1 | 8/2016 | |
| EP | 0 820 933 A1 | 1/1998 | |
| EP | 3 397 494 A1 | 11/2018 | |
| EP | 3 612 452 B2 | 7/2021 | |
| JP | H04-503260 A | 6/1992 | |
| JP | H08-058755 A | 3/1996 | |
| JP | 2000-247319 A | 9/2000 | |
| JP | 2003-509297 A | 3/2003 | |
| KR | 2012-0063782 A | 6/2012 | |
| WO | WO 00/73152 A1 | 12/2000 | |
| WO | WO 2009/136138 A1 | 11/2009 | |
| WO | WO-2009136138 A1 * | 11/2009 | ............... B65C 9/18 |
| WO | WO 2012/086254 A1 | 6/2012 | |
| WO | WO 2016/191663 A1 | 12/2016 | |
| WO | WO 2017/208146 A1 | 12/2017 | |

OTHER PUBLICATIONS

PCT/US2019/040133, Sep. 4, 2019, International Search Report and Written Opinion.
International Search Report and Written Opinion for International Application No. PCT/US2019/040133, dated Sep. 4, 2019.
Invitation to Pay Additional Fees for International Application No. PCT/US2018/028631, dated Aug. 16, 2018.
International Search Report and Written Opinion for International Application No. PCT/US2018/028631, dated Nov. 29, 2018.
International Preliminary Report on Patentability for International Application No. PCT/US2018/028631, dated Oct. 31, 2019.
Extended European Search Report for European Application No. 21175637.4, dated Sep. 30, 2021.
Opposition against European Patent No. EP 3612452 B2, submitted Apr. 20, 2022 by Reddie & Grose, 65 pages.

\* cited by examiner

SYSTEMS AND METHODS FOR DECORATING SUBSTRATES

RELATED APPLICATION

This application claims priority under 35 U.S.C. § 119(e) to U.S. Provisional Application Ser. No. 62/692,941, entitled "SYSTEMS AND METHODS FOR DECORATING SUBSTRATES" filed Jul. 2, 2018, which is herein incorporated by reference in its entirety.

FIELD

Disclosed embodiments are related to systems and methods for decorating substrates.

BACKGROUND

Adhesive labels are widely used, such as for providing information and/or decoration on substrates such as bottles and other containers, on packages for shipment, on products for sale, and so on. In some applications, decorations such as labels are formed at a printing facility, which provides the labels on a continuous web that may be rolled onto a spool. During a subsequent labeling process, the web is unwound from the spool and guided through a pre-defined path to a location at which the labels are removed from the web and applied to the substrate.

The labels typically have an adhesive side, whether formed by a pressure-sensitive adhesive (PSA), a glue applied to the label or a thermally-activated or fluid-activated adhesive, that serves to secure the label to a box, product or other substrate. When the label is applied to the substrate, the adhesive side may be exposed, e.g., by peeling the label off of the web or by removing a liner from the adhesive side. In certain applications, the adhesive side may be non-tacky until just prior to applying the label, at which time the adhesive is activated (e.g., by applying heat or an activation fluid) and the label is applied to the substrate.

SUMMARY

Aspects described herein relate to systems and methods for decorating substrates. According to some embodiments, decorations (e.g., labels) may be formed on a carrier web (e.g., a film, belt or other suitable web substrate) at one or more decoration forming stations positioned along a web path, and the decorations may be subsequently applied to substrates at an application station positioned along the web path after the decoration forming station(s). In this manner, a single system may be used to both form the decorations and apply the decorations to substrates.

The decorations formed at the decoration forming station may include one or more decoration layers formed in register with one another on the carrier web to form the decoration. Moreover, the decorations include an adhesive layer, such as a pressure sensitive adhesive layer, formed in register with the one or more decoration layers. Prior to application of the decorations to the substrates, the adhesive layer is exposed on a surface of the decoration facing outwardly from the carrier web. When a decoration is applied to a substrates at the application station, the adhesive layer is brought into contact with a surface of a substrate to adhere the decoration to the substrate as it is released from the carrier web. For example, in embodiments employing a pressure sensitive adhesive layer, an adhesion between the pressure sensitive adhesive layer and the substrate may be sufficient to pull the decoration off of the carrier web, thereby releasing the decoration from the carrier web.

A decoration forming station may include any suitable arrangement for forming the one or more decoration layers on the carrier web. For example, a decoration forming station may utilize printers such as inkjet printers or other suitable printing systems to deposit the one or more decoration layers in register with one another on the carrier web to form a decoration. In some embodiments, a decoration forming station may be configured for variable printing such that each decoration can be different, which may allow for individualized decorations to be formed and applied to specific substrates. In some embodiments, such variable printing arrangements may provide for individualized labeling runs in which labels can be changed from container to container as needed. However, it should be understood that the current disclosure is not limited to variable printing arrangements. For example, fixed printings systems such as flexographic printers, and/or stamping systems such as hot or cold foil stamping systems may be suitable. Moreover, in some embodiments, a decoration forming station may include multiple types of systems to form decorations. For example, a single decoration forming station may include a combination of a flexographic printer, inkjet print heads, and/or hot or cold stamping systems.

According to some aspects, one or more layers of a decoration may be curable, for example, such that the decoration layers may be permanently in place relative to one another after the decoration layers are deposited on the carrier web at a decoration forming station. In some embodiments, one or more curing stations may be positioned after the decoration forming station(s), and the curing station(s) may be configured to apply a curing treatment to the decoration layers to cure the decoration layers. For example, the curing station(s) may be configured to expose the decoration layers to radiation, such as ultraviolet light, visible light, infrared light, thermal radiation (e.g., heat), electron radiation, a drying process such as exposure of the decoration layers to a flow of air or heated air (or other suitable gas), and/or any other suitable curing process, as the current disclosure is not limited in this regard.

In some embodiments, a system may include multiple decoration forming stations and/or curing stations. For example, each decoration forming station may be configured to form one or more decoration layers, and curing stations may be positioned between each decoration forming station to cure the decoration layers prior to forming additional decoration layers at one or more subsequent decoration forming stations. In some embodiments, multiple curing stations may be provided after each decoration forming station. Moreover, it should be understood that different curing stations may be configured to expose the various layers of a decoration to the same type of curing process, or different types of curing processes.

According to some aspects, the adhesive layer of a decoration may be activatable such that the adhesive is initially deposited as a coating and subsequently activated at an activation station to become a tacky adhesive (e.g., a tacky pressure sensitive adhesive). The activation station may be positioned along the web path between the decoration forming station and the application station. For example, in some embodiments, a pressure sensitive adhesive may be UV activatable such that the adhesive increases its viscoelasticity and/or viscosity (e.g., becomes tacky) after exposure to ultraviolet radiation at an activation station. For instance, a UV activatable adhesive may be deposited onto a decoration in a wet or low viscosity state, and may maintain this low viscosity fluid until the adhesive is cured to a higher viscosity tacky state at an activation station where the UV activatable adhesive is exposed to UV radiation. In some instances, such adhesives may be referred to as UV-curable adhesives. The inventors have appreciated that such arrangements in which an adhesive layer is substantially non-tacky until being activated may provide numerous benefits. For example, activatable pressure sensitive adhesives may allow for easier deposition of the pressure sensitive adhesive layer when forming a decoration at a decoration forming station compared to a tacky adhesive. Moreover, when a tacky adhesive is exposed on the carrier web, contact between the exposed adhesive and elements of a web control system such as guides or rollers may damage the decoration or web and/or foul the web control system. In contrast, an activatable adhesive may be non-tacky (e.g., the adhesive may remain in a low viscosity, flowing liquid state) until being activated at an activation station immediately prior to application to a substrate. Depending on the particular embodiment, suitable adhesives may include, but are not limited to UV-activatable (i.e., UV-curable) adhesives, solvent-based or aqueous adhesives that may be cured or dried from a low viscosity state to a high viscosity state, thermally-activatable adhesives, water-activatable adhesives, and/or solvent-activatable adhesives. Moreover, it should be understood that an activation station may be configured to apply any suitable curing, drying, and/or other activation process.

In some embodiments, a curing station may be configured to both cure the decoration layers of a decoration as well as to activate an activatable pressure sensitive adhesive layer of the decoration. Accordingly, the systems disclosed herein may include one or more curing stations that are configured to cure one or more decoration layers (e.g., if the decoration layers require curing), and at least one curing station may be configured to perform activation of an activatable pressure sensitive adhesive layer. In other embodiments, a system may include one or more curing stations configured for curing one or more decoration layers, and a separate activation station configured to activate an activatable adhesive layer (e.g., an activatable pressure sensitive adhesive layer such as a UV-activatable adhesive). Moreover, in some embodiments, the decoration layers may not require curing, and only an activation station may be provided to activate an activatable adhesive layer. Alternatively, in some embodiments, neither curing of the decoration layers nor activation of the adhesive layer may be required, and the systems may not include a curing station or activation station. Accordingly, it should be understood that the systems disclosed herein may, or may not include one or more curing stations and/or an activation station.

Depending on the embodiment, each decoration formed on the carrier web may include a single element that may be applied to a substrate at the application station, or each decoration can include multiple discrete elements that are separate from each other though initially supported on the carrier web and transferred to the same substrate. Each element of a decoration may include one or more decoration layers and a pressure sensitive adhesive layer formed in register with one another to form the decoration element. In some instances, the term "label" may be used to refer to a decoration; accordingly, as used herein, the terms "decoration" and "label" have the same meaning and may be used interchangeably. Thus, in some cases, a label may include a single element or multiple elements that are transferred together to a substrate.

Moreover, it should be understood that the term decoration does not necessarily refer to "decorating" an item in any particular aesthetic sense. For example, a decoration may provide visible graphics, text, colors, optical effects (like diffraction that gives a rainbow effect), machine readable indicia (such as a barcode), tactile effects, topographical features, and so on.

As noted above, after the decorations are formed on the carrier web, they may be applied to substrates at an application station positioned along a web path of the carrier web after the decoration forming station(s) and curing station(s) (if present). In some instances, applying a decoration to a substrate may involve directly transferring the decoration to the substrate from the web. In such embodiments, the decoration is always supported by either the web or the substrate. In other instances, a decoration may be partially or completely separated from the web prior to being applied to the substrate. For example, a portion of a decoration may be separated from the web prior to being applied to the substrate to aid in releasing the decoration from the web when the decoration is applied to the substrate. Moreover, in some instances, multiple portions of a decoration (e.g., separate discrete portions) may be applied to a substrate in a single application or the separate portions may be applied in separate application steps at the application station.

It should be understood that transfer of a decoration from a web to a substrate may be accomplished via any number of suitable mechanisms, and that the current disclosure is not limited to any particular mechanism. For example, in some instances, contact between a pressure sensitive adhesive layer of a decoration and a substrate may cause the decoration to adhere to the substrate and release or separate from the web, thereby resulting in the decoration being transferred directly to the substrate from the web.

As noted above, in some instances, a decoration or label may include multiple separate elements or decoration components. These decoration components may be physically separated from one another on the web, and the decoration components may be transferred together onto a substrate in register with one another, thereby maintaining the relative spacing and arrangement and orientation of the decoration components after being transferred to the substrate. The decoration components may work together to form a single decoration. For example, the decoration components may comprise different graphical elements that work together to form the decoration. In some instances, separate decoration components may include text characters that form a word, phrase, number, and so on.

According to some aspects, a carrier web may be reusable. For example, in some embodiments, a carrier web may be provided as a roll that feeds the carrier web from a web feed roll to the decoration forming station(s) where the decorations are formed on the carrier web and to an application station where the decorations are applied to substrates from the carrier web. After application of decorations to substrates at an application station, the carrier web may be collected in a take-up roll. Once the roll of carrier web has been depleted, the carrier web from the take up roll may be moved to the web feed position and used for additional formation and application of decorations to substrates. In this manner, a single carrier web (e.g., a single roll or other suitable quantity of carrier web) may be used multiple times for successive steps of forming decorations on the carrier web and applying the decorations from the carrier web onto substrates. In some embodiments, a cleaning station may be provided along the path of the carrier web between the application station and the take-up roll. For example, the cleaning station may be configured to remove any residual decoration material from the carrier web that may remain after application of the decorations, which may aid in allowing subsequent decorations to be properly formed on the carrier web in subsequent uses of the carrier web. However, it should be understood that a cleaning station may not be required in some instances, as a carrier web may be reusable without requiring cleaning or other treatment between uses.

In some embodiments, a carrier web may be formed as a continuous loop. For example, after the application station, the carrier web may be guided back to the decoration forming station(s) for subsequent formation and application of decorations to substrates on the same carrier web material. Such arrangements may substantially reduce the amount of carrier web material required for a labeling process and may reduce interruptions in the process, for example, due to changing a roll of carrier web. In some embodiments, a cleaning station may be positioned along the continuous carrier web loop between the application station and the decoration forming station(s).

It should be understood that the current disclosure is not limited to any particular material for a carrier web and/or any type of carrier web. For example, the carrier web may be formed as an extended thin, flexible material, such as a polymeric, metallic, and/or composite material. In some embodiments, a carrier web may define a substantially continuous film, web, belt, or other suitable substrate structure on which decorations may be formed for subsequent application to substrates. For example, as noted above, such continuous carrier web structures may be stored in rolls. In other embodiments, a carrier web may comprise a plurality of connected segments that may fold upon each other such that the carrier web may be stored in one or more stacks. In such embodiments, each segment of the carrier web may be sized and shaped to allow one or more decorations and/or decoration elements to be formed thereon.

Moreover, in some embodiments, a carrier web may include one or more textured features, which may be configured to impart a desired pattern, topography, and/or or other textural effect onto decorations formed on the carrier web. For example, textured features on the carrier web may include depressions configured to form raised features on a decoration (e.g., to form embossed features on the decoration), and/or protrusions configured to form depressions on the decoration (e.g., to form relief features on the decoration). Depending on the particular embodiment, textured features on a carrier web may have any suitable shape and/or arrangement. For example, in some embodiments, textured features on the carrier web may have a shape that corresponds to a shape of a decoration or decoration element such that the textured features define an embossed outline of a decoration to be formed on the carrier web.

In further embodiments, a carrier web may comprise multiple layers of different materials. For example, the carrier web may include a base layer defining a surface on which decorations will be formed, and a mask layer that partially overlies the base layer. In particular, the mask layer may cover portions of the carrier web where decorations will not be formed, and may have openings to expose the base layer in portions of the carrier web where the decorations will be formed. A material of the mask layer may be selected such that the decoration layers of the decorations do not adhere to the mask material, which may aid in cleaning the carrier web and/or otherwise allowing the carrier web to be reused. In one exemplary embodiment, the mask layer may be formed from silicon.

In one embodiment, a system for decorating substrates includes a carrier web and a decoration forming station configured to form decorations on the carrier web. Each decoration includes one or more decoration layers and an adhesive layer formed in register with the one or more decoration layers and exposed on a surface of the decoration facing outwardly from the carrier web. The system further includes an application station at which the decorations are applied to substrates from the carrier web, and a web path along which the carrier web travels to transport the decorations from the decoration forming station to the application station.

In another embodiment, a method for decorating a substrate includes transporting a portion of a carrier web along a web path to a decoration forming station, and forming a decoration on the portion of the carrier web at the decoration forming station. The decoration includes one or more decoration layers and an adhesive layer formed in register with the one or more decoration layers and exposed on a surface of the decoration facing outwardly from the carrier web. The method further includes transporting the decoration along the web path from the decoration forming station to an application station after forming the decoration and applying the decoration to a substrate at the application station.

In a further embodiment, a system for decorating substrates includes a carrier web defining a web path and a plurality of decoration forming stations positioned along the web path. Each decoration forming station may be configured to form at least a portion of a decoration on the carrier web and each decoration includes one or more decoration layers and an adhesive layer formed in register with the one or more decoration layers and exposed on a surface of the decoration facing outwardly from the carrier web. The system further includes a plurality of curing stations, with each curing station positioned along the web path after an associated decoration forming station and configured to cure a portion of the decoration formed at the associated decoration forming station. Moreover, the system includes an application station positioned along the web path after the decoration forming stations and curing stations. The decorations are applied to substrates from the carrier web at the application station.

Moreover, as described in more detail below, the systems described herein may further include one or more features configured for carrier web accumulation and/or control of the tension of the carrier web. For example, such features may include one or more web festoons positioned along a web path before the decoration forming stations, between decoration forming stations and/or curing stations, between a decoration forming station and an application station or curing station, between a curing station and an application station, and/or after an application station.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
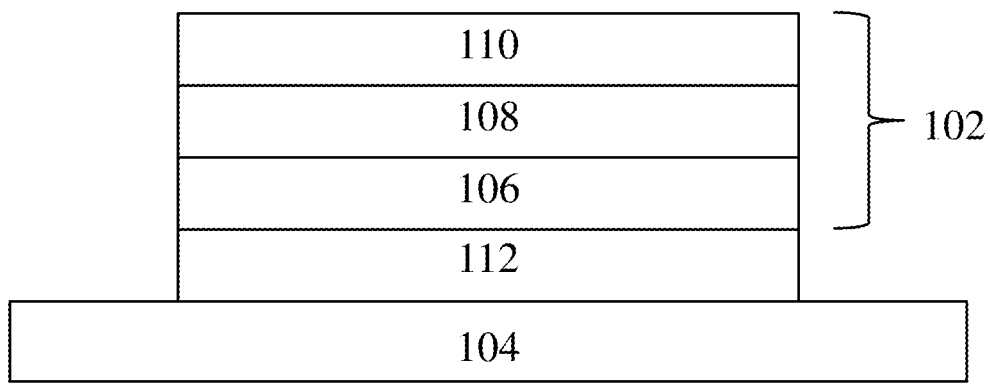
FIG. 1 a schematic cross-sectional view of a decoration formed on a carrier web, according to one embodiment.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In some embodiments, decorations such as labels may be formed on a carrier web. Each label may include a layer of a pressure sensitive adhesive, and the adhesive layer may be exposed on the carrier web after the decoration is formed. The decorations may be formed on the carrier web using a suitable printing method such as inkjet printing or flexographic printing. For example, the decorations may include a first decoration layer formed on the carrier web, and this first decoration layer may form the outer surface of the decoration when the decoration is applied to a substrate. This first decoration layer may be optically clear or colored. One or more indicia layers may be provided on the first decoration layer, followed by a pressure sensitive adhesive layer formed on the indicia layer(s). In this manner, the decorations may be reverse printed and may feature an exposed pressure sensitive adhesive layer which may be located between the substrate and the indicia and first decoration layers when the decoration is applied to the substrate. In some instances, a release layer may be provided between the carrier web and the first decoration layer to facilitate release of the decorations from the carrier web when the decorations are applied to substrates. For example, decorations such as labels and webs which may be used with the systems provided herein are described in US Patent Application Pub. No. 2016/0335927, which is hereby incorporated by reference in its entirety. However, it should be understood that other types of decorations may be suitable, as the current disclosure is not limited to any particular arrangement and/or method for forming decorations. For example, other suitable types of decorations may include decorations formed by techniques including, but are not limited to, hot or cold foil stamping, flexographic printing, embossing, and/or inkjet printing.

Depending on the particular embodiment, the decorations may bear any suitable visible or non-visible information, such as text, graphics, electronic circuitry (such as an RFID device), etc. Moreover, a decoration may be provided as a single, continuous piece of material applied to a substrate, or alternatively, the decoration may be formed as a plurality of separate decoration components which collectively form the decoration. It should be understood that the systems described herein may be suitable for applying decorations to any suitable substrates, such as bottles or other containers (including irregularly shaped containers), boxes, envelopes, or other packaging materials, products for sale, etc. Moreover, the substrates may be formed from any suitable material, including, but not limited to, paper-based materials, glass, metallic materials (such as aluminum and steel), and polymeric materials (such as PET, PETE, LDPE, HDPE, and PS).

FIG. 1 depicts a schematic cross-sectional view of a decoration 102 formed on a carrier web 104. The decoration 102 includes a first decoration layer 106 (e.g., an overcoat layer), which forms the outermost exposed layer of the decoration when the decoration is applied to the substrate. The decoration further includes one or more indicia layers 108, and an adhesive layer 110, such as a pressure sensitive adhesive layer, which is exposed on a surface of the decoration facing outwardly from the carrier web 104. Each of the layers of the decoration 102 may be formed in register with one another at one or more decoration forming stations to form the decoration. However, it should be understood that registration of the various layers may not require perfect overlap of the layers as illustrated. For example, in some instances, one or more indicia layers 108 may be formed over only a portion of a decoration 102 to provide a desired appearance or arrangement of features in the decoration. In some embodiments, a release layer 112 may be formed between the carrier web 104 and the first decoration layer 106. The release layer may aid in releasing the decorations 102 from the carrier web 104 when the decorations are applied to substrates at an application station.

Figure 2:
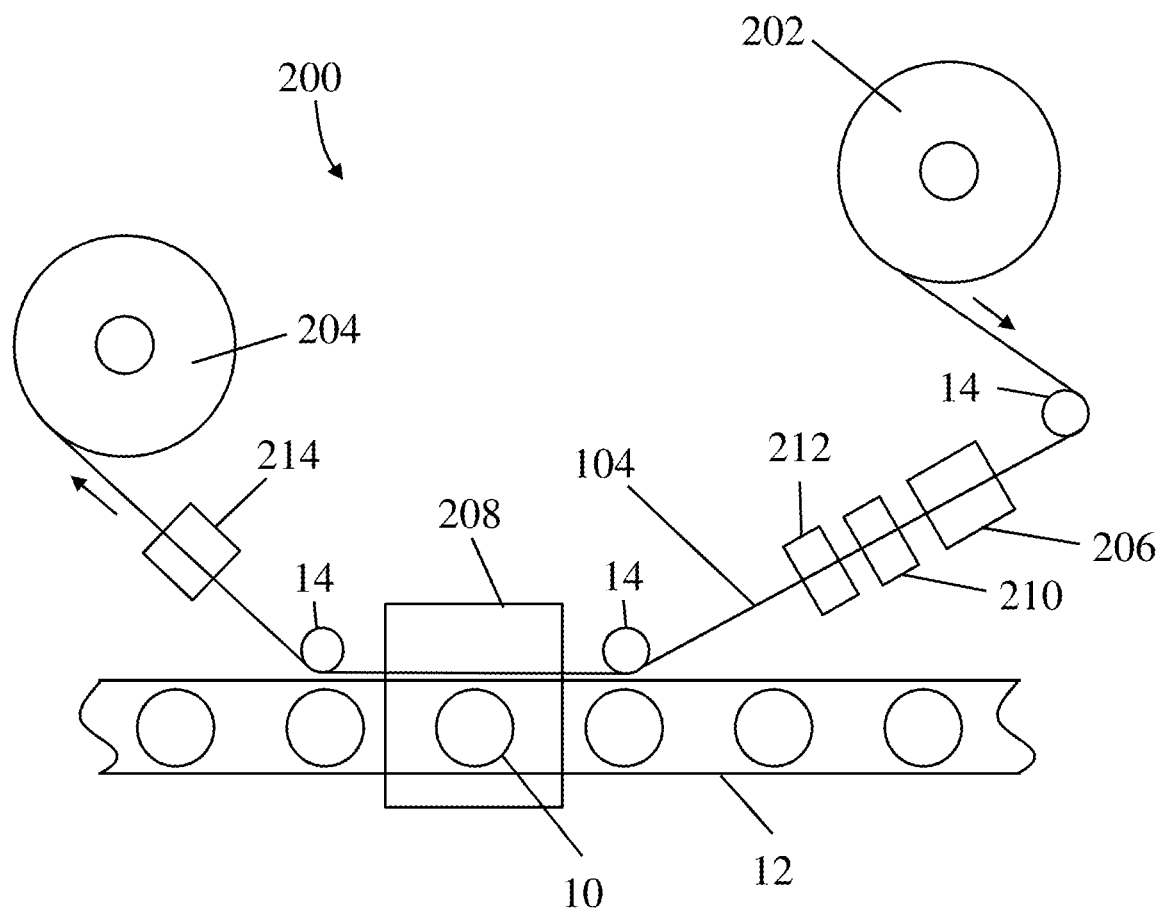
FIG. 2 is a schematic top view of a system for decorating substrates, according to one embodiment.

FIG. 2 depicts an illustrative embodiment of a system 200 for decorating substrates 10. The system includes a carrier web 104 that travels along a web path from a carrier web supply roll 202 to a carrier web take-up roll 204. The system includes one or more web controllers 14 such as rollers (e.g., drive, idle, or tension rollers), or other web control features such as web guides as are known in the art for controlling various aspects or characteristics of the carrier web 104. These characteristics may include a direction or velocity of the carrier web, a web tension, a web alignment, and/or a position of the web along a direction transverse to a direction along which the web travels (e.g., to adjust the vertical alignment of the web and labels relative to the bottles). The system may include any suitable number and/or arrangement of web controllers to guide and/or control a web as desired (e.g., to define a desired web path) as the current disclosure is not limited in this regard.

The web controllers 14 are arranged to guide the carrier web from the supply roll 202 to a decoration forming station 206 where decorations are formed on the carrier web 104. After the decorations are formed on the carrier web, the decorations are transported on the carrier web to an application station 208 where the decorations are applied to the substrates 10. After application of the decorations, the carrier web is collected at the take-up roller 204 positioned along the web path after the application station 208.

At the decoration forming station 206, the various layers of the decorations, such as the overcoat layer, indicia layer (s), adhesive layer, and release layer (if included) are formed on the carrier web. It should be understood that a decoration may be formed or deposited on the carrier web in any suitable manner. For example, in some embodiments, the decoration forming station includes an inkjet printing system with one or more print heads arranged to deposit the various decoration layers onto the carrier web in register with one another to form the decorations. In other embodiments, the decoration forming station 206 may include a flexographic printing system, or any other suitable printing system, as the disclosure is not limited to any particular system or method for depositing the decoration layers onto the carrier web. Moreover, it should be understood that the various layers of decoration may be formed using any number of suitable processes or systems. For instance, in some embodiments, the pressure sensitive adhesive layer may be formed using substantially the same processes as those used to form other layers of the decoration. Alternatively, the pressure sensitive adhesive layer may be formed using a different process than the process(es) used to form the other decoration layers.

In some embodiments, a curing station 210 is provided between the decoration forming station 206 and the application station 208. For example, one or more decoration layers (e.g., the indicia layers) may be cured at the curing station 208 to permanently set the decoration layers in place relative to one another. As noted above, the curing station may be configured to apply any suitable curing process, such as curing via exposure to radiation (e.g., UV, visible light, thermal, or electron radiation), or a drying process such as exposure to hot air. Accordingly, it should be understood that the current disclosure is not limited to any particular curing process at the curing station. Moreover, while one curing station is depicted in this embodiment, it should be understood that the systems disclosed herein may include more than one curing station after a decoration forming station, and that each curing station may be configured to perform the same or different types of curing processes.

In some embodiments, the adhesive layer of the decorations may be activatable such that the adhesive increases its viscoelasticity and becomes tacky after activation. Accordingly, the system 200 may include an activation station 212 configured to apply a suitable activation treatment to activate the adhesive. For instance, in some embodiments, the adhesive may comprise a UV activatable pressure sensitive adhesive, and the activation station 212 is configured to expose the pressure sensitive adhesive layer to ultraviolet radiation with a broad spectrum ultraviolet radiation source and/or an LED-based ultraviolet light source. Similar to the curing station 201, the activation station 212 may be configured to apply any suitable activation process, such as activation via exposure to radiation (e.g., UV, visible light, thermal, or electron ration), or a drying process such as exposure to hot air. Accordingly, it should be understood that the current disclosure is not limited to any particular activation process at the activation station.

In one embodiment, a pressure sensitive adhesive layer may be primarily composed of low-molecular weight monomers, and in its fully cured state, the adhesive layer is substantially non-tacky or exhibits relatively low tack. The adhesive layer may be deposited and partially activated or deliberately under-activated to create an intermediate that is tacky. Such an arrangement may allow for the use of low viscosity coatings to be used as adhesives. Once the decoration is transferred to a substrate, the substrate may be transported through a secondary activation station at which the activation process of the adhesive layer is completed. After activation at the secondary activation station, the adhesive layer will no longer be tacky but will form a strong bond between the substrate and the decoration layers.

In some embodiments, the curing station 210 may be configured to both cure the various decoration layers (if curing is needed) and activate the pressure sensitive adhesive layer, and thus an activation station may not be included. Alternatively, curing of the decoration layers and activation of the pressure sensitive adhesive layers may not be required, and thus a system may not include a curing station or activation station. Moreover, in some embodiments, one or more decoration layers could be applied, then cured, and then a pressure sensitive layer could be applied and optionally activated. That is, a curing station could be positioned between portions of the decoration station.

After the decorations are formed on the carrier web and cured (if a curing station is included) and the adhesive layer is activated (if required), the decorations are transported on the carrier web to the application station 208 where the decorations are applied to the substrates. At the label application station 208, the pressure sensitive adhesive layer of the decorations may be brought into contact with substrates 10, and the adhesion between the pressure sensitive adhesive layer and the substrates may cause the decorations to release from the carrier web 104 and adhere to the substrates. For example, the adhesive force between the adhesive layer and the substrates 10 may be selected to be larger than an adhesive force between the decorations and the carrier web, thereby allowing the contact with the substrates to pull the decorations off of the carrier web. As noted above, in some instances, a release layer may be formed between the carrier web and an overcoat layer of a decoration. The release layer may be configured to facilitate release of the decoration from the release layer when the pressure sensitive adhesive layer of the decoration is brought into contact with the substrate.

Depending on the particular embodiment, the decorations may be applied to the substrate in any suitable manner at the application station 208. For example, in some embodiments, the decorations may be directly transferred from the carrier web to the substrate, such that the decorations are always supported by either the carrier web or the substrate. In other embodiments, an application station may include one or more features to assist with applying a decoration from a web to a substrate. For instance, an adhering force between the decorations and the web may be similar in strength to an adhering force between the adhesive layer of the decorations and the substrate. Therefore, it may be advantageous to assist with releasing the decorations from the web at the application station to ensure proper application of the decoration to the substrate. In some embodiments, an actuator may be provided at the application station to forcibly press the decorations into contact with the substrate, which may increase the adhesion force between the adhesive layer of the decoration and the substrate. For example, systems and methods for applying decorations (such as labels) to substrates that may be used with the systems and methods provided herein are described in U.S. patent application Ser. No. 15/958,661. However, it should be understood that other systems and methods for applying decorations to substrates at an application station also may be suitable.

As illustrated in FIG. 2, the substrates 10 may be provided on a substrate transport such as a belt 12 to move the substrates towards and through the application station 208.

While a linear belt 12 is shown in the figures, it should be understood that the systems described herein are not limited to any particular arrangements for transporting substrates to the application station 208. For example, other arrangements, such as rotary or screw style transport systems may be suitable.

In some embodiments, a web control system may control movement of the carrier web 104 through the decoration forming station 206, application station 208, and/or curing station 210. For example, the web control system may be configured to stop or slow movement of the carrier web to facilitate deposition of the various layers of a decoration at the decoration forming station to form a decoration. In some embodiments, the web control system may be configured to stop movement of the carrier web when a decoration is positioned at the application station 208, and while the web is stopped, the movement of the substrates along the belt 12 may impart relative motion between the decoration positioned at the application station and a substrate moving through the application station. The substrate and label may be brought into contact at the application station, and this relative movement may result in the label being applied to the substrate, (e.g., by transferring directly from the web to the substrate). After application of the label from the web to the substrate, the web controller may subsequently move the web to move another label to the application station.

As noted above, in some embodiments, a carrier web may be reusable such that decorations may be formed on the same carrier web multiple times and applied to substrates therefrom. In some such embodiments, a cleaning station 214 may be positioned along the web path, such as between the application station 208 and the take-up roll 204. The cleaning station may be configured to clean the carrier web to prepare the carrier web for subsequent formation of decorations on the carrier web. For example, the cleaning station may remove any residual decoration material left on the carrier web after application of the decorations. In some instances, the cleaning station may remove a release layer that was previously deposited on the carrier web. Moreover, while the cleaning station is located between the application station and the take-up roll in the depicted embodiment, in other embodiments, a cleaning station may be positioned between the web supply roll 202 and the decoration forming station 206.

Figure 3:
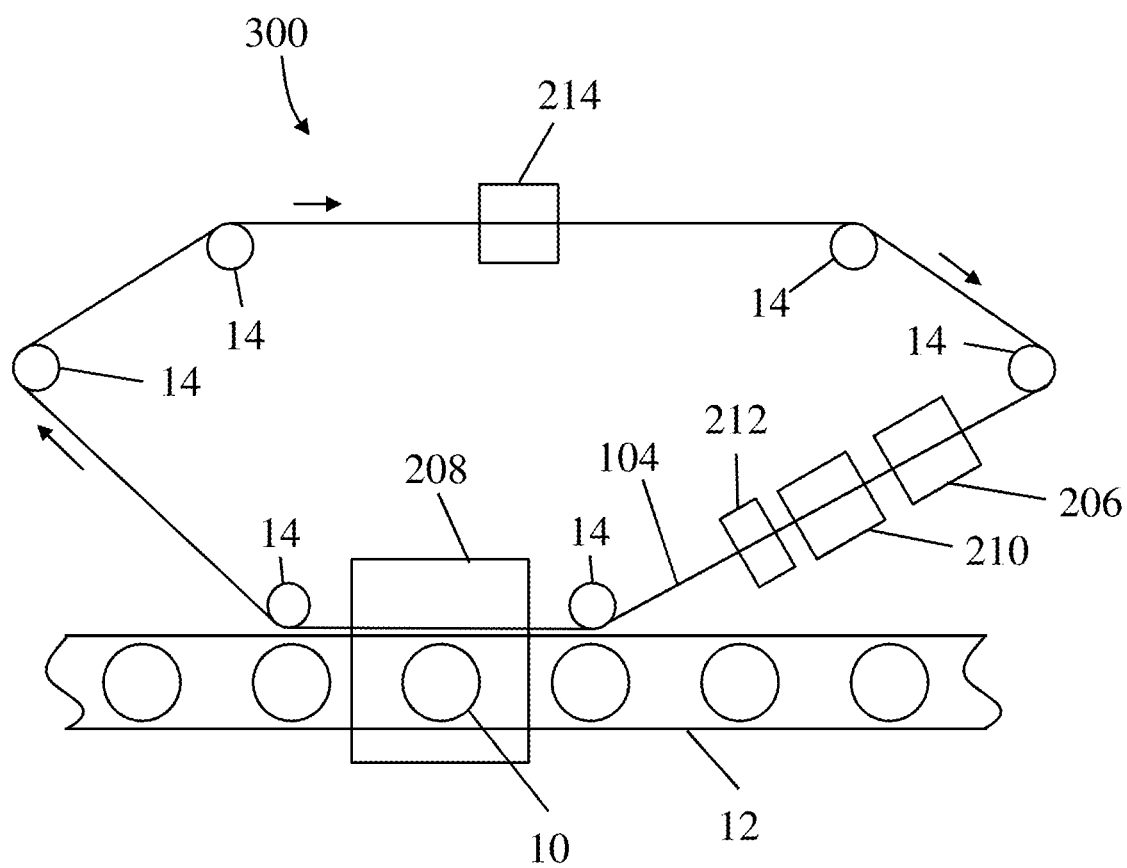
FIG. 3 is a schematic top view of a system for decorating substrates including a carrier web formed as a continuous loop, according to one embodiment.

As discussed previously, in some embodiments, a reusable carrier web may be formed as a continuous loop. For example, FIG. 3 depicts an embodiment of a system 300 for decorating substrates 10 similar to the embodiment discussed above in connection with FIG. 2, but in which the carrier web 104 forms a continuous loop. In particular, the system 300 includes web guides 14 arranged to guide the carrier web from the application station 208 back to the decoration forming station 206. Additionally, the system 300 may include a cleaning station 214 positioned along the web path between application station 208 and the decoration forming station 206 to clean the carrier web 104.

Figure 4:
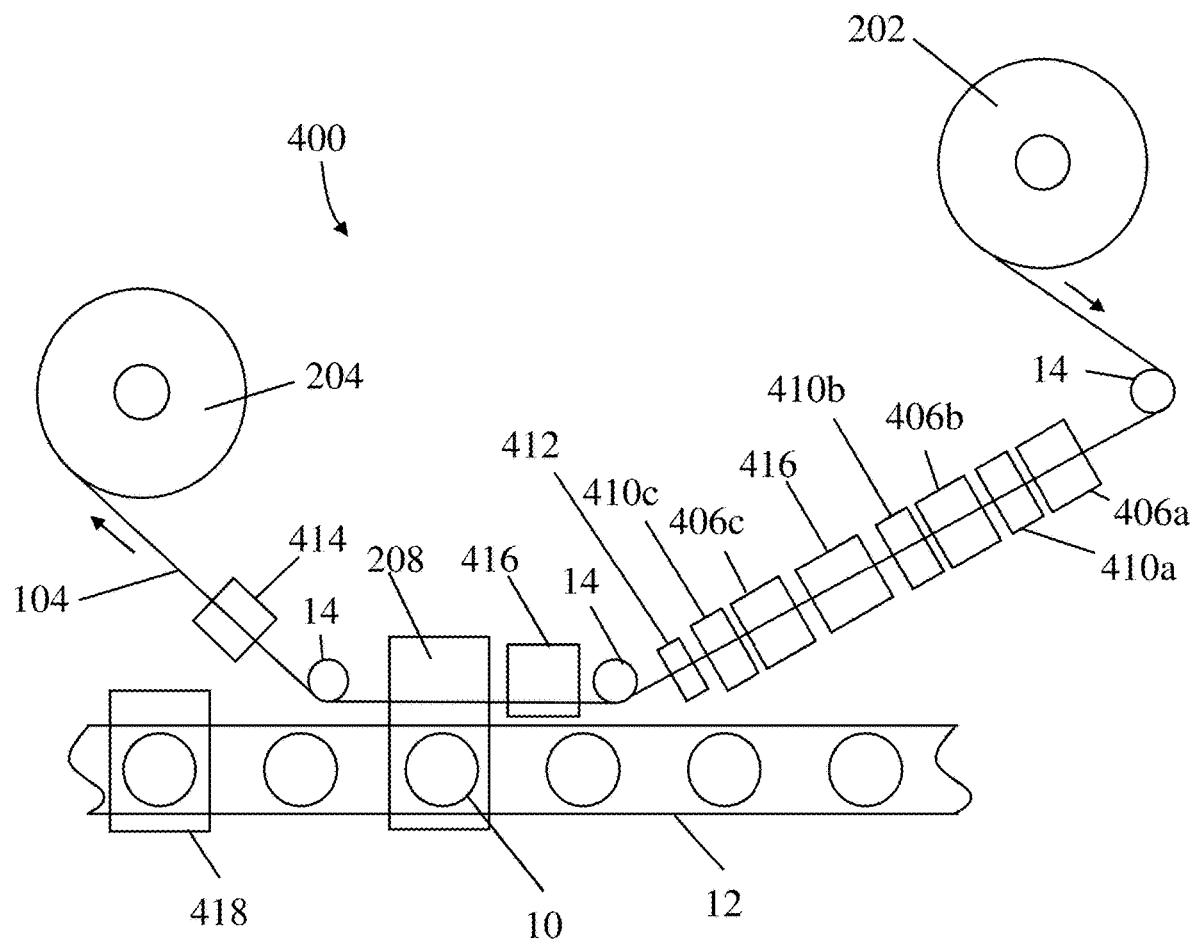
FIG. 4 is a schematic top view of a system for decorating substrates including multiple decoration forming stations, according to one embodiment.

FIG. 4 depicts another embodiment of a system 400 for decorating substrates 10. Similar to the embodiment discussed above in connection with FIG. 2, the system 400 includes a carrier web 104 that travels along a web path from a carrier web supply roll 202 to a carrier web take-up roll 204, as well as a web control system including one or more web controllers 14. The system further includes an application station 208 and a substrate transport 12 arranged to transport substrates 10 to the application station where decorations are applied to the substrates.

In the depicted embodiment, the system 400 includes three decoration forming stations 406a, 406b, and 406c, and three curing stations 410a, 410b and 410c positioned along the web path before the application station 208. Each decoration station is configured to form a portion of the decoration. For example, the first decoration station 406a may be configured to deposit the overcoat layer of a decoration, the second decoration station 406b may be configured to deposit the indicia layer(s) of the decoration, and the third decoration station 406c may be configured to deposit the pressure sensitive adhesive layer of the decoration. As noted previously, each layer may be deposited in register with the other layers to form the decoration. Each curing station 410a, 410b, and 410c is positioned along the web path after an associated decoration forming station, and each curing station may be configured to cure the layer(s) deposited at its associated decoration forming station. For instance, the first curing station 410a may be configured to cure the layer(s) deposited at the first decoration forming station 406a before subsequent layers of the decoration are formed and cured at the second and third decoration forming stations and curing stations, respectively.

While three decoration forming stations 406 and associated curing stations 410 are depicted in FIG. 4, it should be understood that the current disclosure is not limited to any particular number of decoration forming stations and/or curing station used to form a decoration on the carrier web. For example, in some embodiments, a system may include two decoration forming stations and curing stations, or more than three decoration forming stations and curing stations. Moreover, in some embodiments, the number of curing stations may be different than the number of decoration forming stations. For example, a single curing station may be configured to cure layers of a decoration deposited at multiple decoration forming stations.

As illustrated in FIG. 4, the system 400 may further include an activation station 412 at which an activatable pressure sensitive adhesive layer may be activated (if required). However, as discussed above, a curing station (e.g., curing station 410c) may be configured to activate the activatable adhesive layer, and thus the activation station may not be included in some embodiments. Additionally, in some embodiments, a second adhesive activation station 418 may be positioned after the application station 218. This second activation station may be configured to apply an activation or curing treatment to the adhesive after a decorations has been applied to a substrate 10. For example, the second activation station 418 may be configured to apply UV radiation to the adhesive to at least partially cure (or otherwise activate) a UV-curable adhesive. However, it should be understood that activation of the adhesive prior to application (e.g., at activation station 412 or curing station 410c) may be sufficient in some applications, and thus the second activation station 418 may not be included in some embodiments.

Similar to the embodiments discussed above in connection with FIGS. 2-3, the system 400 also may include a cleaning station 414 configured to clean the carrier web to prepare the carrier web for subsequent formation of decorations on the carrier web.

Figure 5:
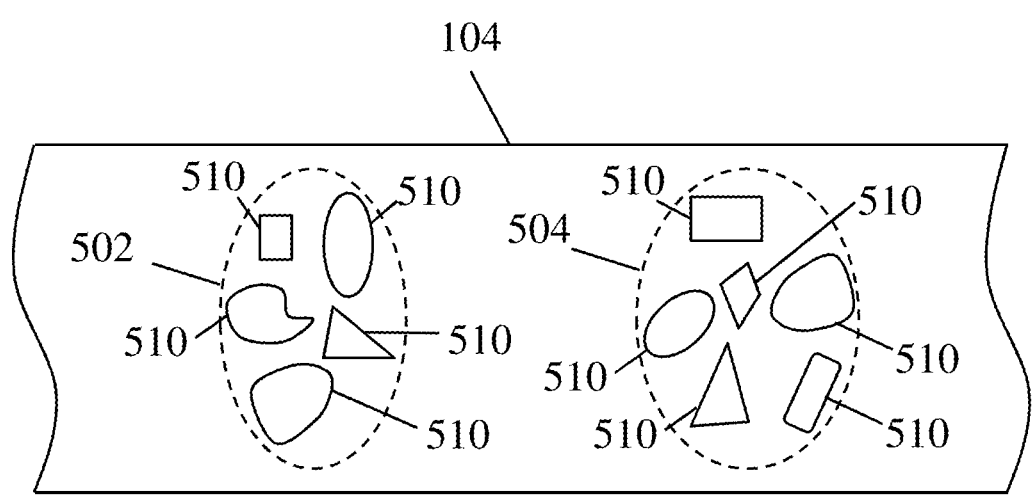
FIG. 5 is a schematic representation of decorations formed on a carrier web, according to one embodiment.

In some embodiments, a system for decorating substrates may include one or more features to aid in controlling the web 104, such as festoons 416 to aid in containing the web along different portions of the web path. For example, the festoons 416 may be configured to define a variable path length through which the web travels in order to allow accumulation of the carrier web within the festoons. As illustrated, festoons 416 may be positioned at one or more locations along the web path, such as prior to the application station 208 and/or between curing stations and decoration stations (e.g., between curing station 410b and decoration station 406c). As discussed above, in some instances, a decoration may include two or more physically separate components that together make up a single decoration. For example, FIG. 5 depicts a portion of a carrier web 104 with two decorations 502 and 504 formed thereon. Each decoration includes multiple separate decoration elements 510. When the decorations 502 and 504 are applied to substrates, the decoration components 510 of each decoration are applied together in register with one another and work together to form a single decoration on the substrate. Depending on the particular embodiment, a decoration may include any suitable number of separate decoration components 510, and each decoration component may have any suitable shape, orientation, color, pattern, and so on. For example each decoration component could be graphic design composed of two or more separate features. In other instances, each decoration may be a text string (e.g., a word, phrase or number), and the decoration components may include individual text characters that together form the text string. Moreover, combinations of different types of decoration components (e.g., graphical, text, or other types of decoration elements) may be included within a single decoration.

As illustrated in FIG. 5, in some embodiments, different decorations 502 and 504 formed on a carrier web may be different from one another. In particular, a decoration forming system may be configured for variable deposition of the various layers of a decoration such that each decoration formed on the carrier web can be different. As a result, each decoration may have include different types, number, and or arrangements of decoration components to form different decorations. In some instances, a system may be configured to form customized decorations for each substrate to be decorated. For example, such arrangements may facilitate individualized labeling runs in which each substrate (e.g., containers) are decorated with individualized labels. However, it should be understood that the current disclosure is not limited to systems utilizing variable printing arrangements, and thus each decoration formed on the carrier web and applied to substrates may be substantially identical in some embodiments.

Figure 6:
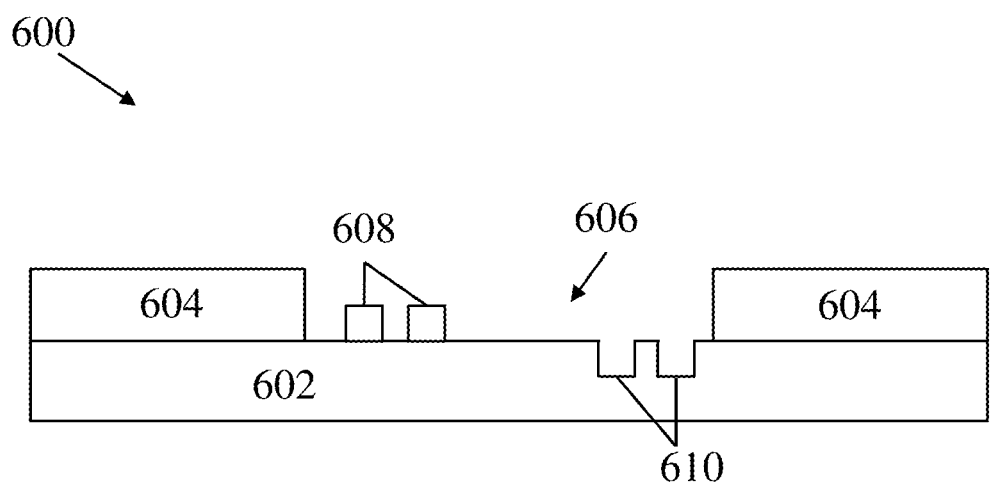
FIG. 6 is a schematic cross-sectional view of a carrier web, according to one embodiment.

Referring now to FIG. 6, a cross-sectional representation of a carrier web 600 is described in more detail. In the depicted embodiment, the carrier web 600 includes a base layer 602 and a masking layer 604. The masking layer includes an opening 606 to expose the base layer 602, such that decorations may be formed directly on the base layer within the opening 606. As discussed above, a material of the masking layer may be selected such that the decorations do not adhere to the masking layer 604 or have lower adhesion to the masking layer relative to the base layer 602. In this manner, the masking layer may aid in cleaning of the carrier web 600, which may facilitate reusing the carrier web for multiple applications of decorations. As also illustrated in FIG. 6, the carrier web 600 may include protrusions 608 and/or depressions 610 configured to form a desired textured surface on a decoration formed on the carrier web. It should be understood that such protrusions and/or depressions may be arranged in any suitable manner and may define any desired geometry and/or arrangement of features. For example, in some embodiments, an arrangement of protrusions 608 and/or depressions 610 may correspond to an outline or a negative of a decoration (or a portion of a decoration) to be formed on the carrier web. For instance, a single protrusion or depression may have a shape corresponding to the shape of the decoration, or multiple protrusions and/or depressions may be positioned around a shape corresponding to the shape of the decoration.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for decorating a substrate, comprising:
   transporting a portion of a carrier web along a web path to a decoration forming station;
   forming a decoration on the portion of the carrier web at the decoration forming station, the decoration comprising one or more decoration layers and an adhesive layer formed in register with the one or more decoration layers and exposed on a surface of the decoration facing outwardly from the carrier web;
   transporting the decoration along the web path from the decoration forming station to an application station after forming the decoration;
   defining a variable path length before the application station through which the carrier web travels to allow accumulation of the carrier web and movement of the carrier web at different speeds at the application station and at another portion of the web path;
   stopping movement of the carrier web when the decoration is positioned at the application station to transfer the decoration to the substrate; and
   applying the decoration to a substrate at the application station by moving the substrate along the carrier web while movement of the carrier web is stopped and removing the decoration from the carrier web.

2. The method of claim 1, wherein the adhesive layer is a pressure sensitive adhesive layer.

3. The method of claim 1, further comprising activating the adhesive layer of the decoration at an activation station positioned along the web path between the decoration forming station and the application station, wherein the adhesive is tacky after being activated.

4. The method of claim 1, further comprising exposing the decoration to radiation and/or an air flow at one or more curing stations positioned along the web path between the decoration forming station and the application station.

5. The method of claim 4, wherein at least one curing station of the one or more curing stations is configured to activate the adhesive layer of the decoration such that the adhesive is tacky after being activated.

6. The method of claim 4, wherein defining the variable path length includes using a festoon to define a variable path length through which the carrier web travels between the decoration forming station and the at least one curing station to allow accumulation of the carrier web.

7. The method of claim 1, wherein defining the variable path length includes using a festoon to define a variable path length through which the carrier web travels only before the application station to allow accumulation of the carrier web.

8. The method of claim 1, wherein the carrier web forms a continuous loop.

9. The method of claim 1, further comprising cleaning the carrier web at a cleaning station positioned along the web path after the application station.

10. The method of claim 1, wherein forming the decoration at the decoration forming station comprises depositing the one or more layers of the decoration onto the carrier web with an inkjet printer or a flexographic printer.

11. The method of claim 1, wherein applying the decoration to the substrate at the application station comprises transferring the decoration from the carrier web directly to the substrate.

12. The method of claim 1, further comprising providing one or more textured features on the carrier web to impart a textural effect to decorations on the carrier web.

13. The method of claim 1, wherein applying the decoration to the substrate includes moving the substrate relative to the stopped carrier web in a direction along which the carrier web extends at the application station.

* * * * *